United States Patent
Chen et al.

(10) Patent No.: US 12,552,672 B2
(45) Date of Patent: Feb. 17, 2026

(54) PROCESSES FOR THE PREPARATION OF EXPANDED GRAPHITE AND EXFOLIATED GRAPHENE OXIDE

(71) Applicants: University of Guelph, Guelph (CA); Zen Graphene Solutions Ltd., Thunder Bay (CA)

(72) Inventors: Aicheng Chen, Guelph (CA); Michael Salverda, Ayr (CA); Antony Raj Thiruppathi, Guelph (CA); Boopathi Sidhureddy, Guelph (CA); Farnood Rahmati, Guelph (CA)

(73) Assignees: University of Guelph, Guelph (CA); Zen Graphene Solutions Ltd., Thunder Bay (CA)

( * ) Notice: Subject to any disclaimer, the term of this patent is extended or adjusted under 35 U.S.C. 154(b) by 538 days.

(21) Appl. No.: 18/026,167

(22) PCT Filed: Sep. 20, 2021

(86) PCT No.: PCT/CA2021/051305
§ 371 (c)(1),
(2) Date: Mar. 14, 2023

(87) PCT Pub. No.: WO2022/056643
PCT Pub. Date: Mar. 24, 2022

(65) Prior Publication Data
US 2023/0357020 A1  Nov. 9, 2023

Related U.S. Application Data

(60) Provisional application No. 63/080,239, filed on Sep. 18, 2020.

(51) Int. Cl.
*C01B 32/198* (2017.01)
*C01B 32/19* (2017.01)
*C01B 32/225* (2017.01)

(52) U.S. Cl.
CPC .......... *C01B 32/198* (2017.08); *C01B 32/19* (2017.08); *C01B 32/225* (2017.08)

(58) Field of Classification Search
CPC .............................. C01B 32/198; C01B 32/225
See application file for complete search history.

(56) References Cited

U.S. PATENT DOCUMENTS

2019/0112195 A1* 4/2019 Pei .................. C01B 32/205

FOREIGN PATENT DOCUMENTS

| CN | 101327926 B | 12/2008 |
| CN | 104591174 A | 5/2015 |

OTHER PUBLICATIONS

International Search Report and Written Opinion dated Dec. 10, 2021 in respect of PCT/CA2021/051305.
Rao et al., "Role of Peroxide Ions in Formation of Graphene Nanosheets by Eelectrochemical Exfoliation of Graphite", Scientific Reports, 4, p. 4237, Feb. 28, 2014.
Mao et al., "Simultaneous electrochemical synthesis of few-layer graphene flakes on both electrodes in protic ionic iquids", Chemical Communications, 49, pp. 5301-5303, Apr. 23, 2013.

\* cited by examiner

*Primary Examiner* — Stuart L Hendrickson
(74) *Attorney, Agent, or Firm* — Smart & Biggar LP; Dominique Lambert

(57) ABSTRACT

The present application relates to expanded graphite and exfoliated graphene oxide. More specifically, the present application relates to process for their preparation and uses thereof. The present application includes a process for preparing expanded graphite comprising: mixing graphite with H2SO4/H3PO4 to form a first mixture; adding KMnO4 to the first mixture to form a second and mixture; adding at least one Fe(III) salt to the second mixture under conditions to form a solid graphite-intercalated compound; separating the solid graphite-intercalated compound from the second mixture; and heating the solid graphite-intercalated compound under conditions to provide the expanded graphite. The present application also includes a process for preparing exfoliated graphene oxide comprising: compressing expanded graphite to form a flexible graphite foil; immersing the flexible graphite foil in a solution comprising at least one alkali metal hydroxide and optionally at least one oxidizing agent, and applying voltage under conditions to electrochemically exfoliate the flexible graphite foil to provide the exfoliated graphene oxide.

21 Claims, 10 Drawing Sheets

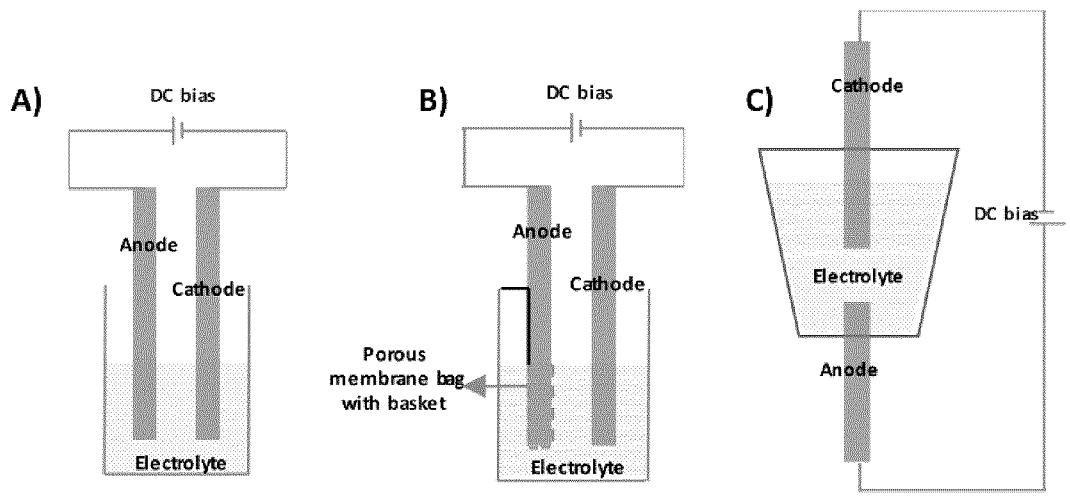
FIG. 1 – PRIOR ART
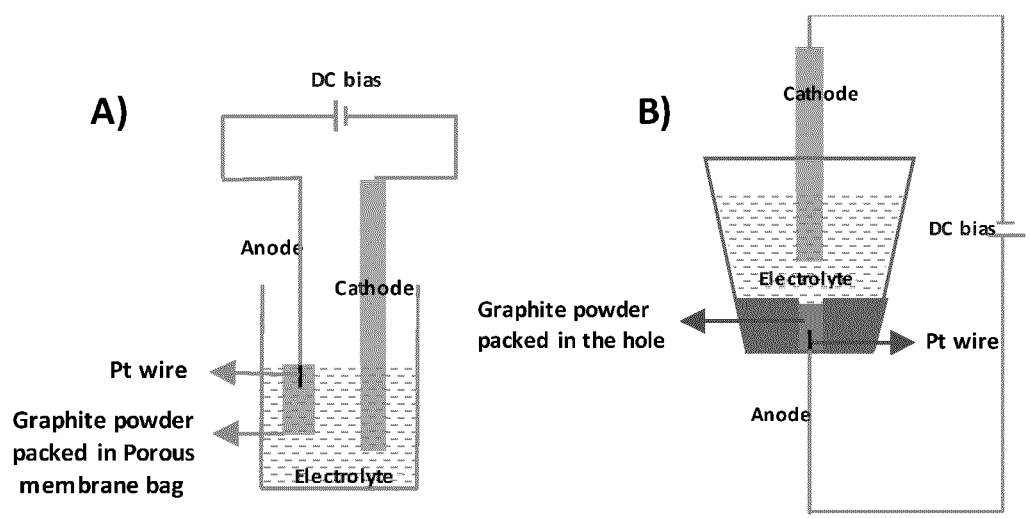
FIG. 2 – PRIOR ART

PROCESSES FOR THE PREPARATION OF EXPANDED GRAPHITE AND EXFOLIATED GRAPHENE OXIDE

CROSS-REFERENCE TO RELATED APPLICATION

The present application is a national stage of co-pending International Application No. PCT/CA2021/051305 filed Sep. 20, 2021, which claims priority to U.S. patent application No. 63/080,238, which was filed on Sep. 18, 2020, the entire contents of each are incorporated herein by reference in their entirety.

FIELD

The present application is in the field of expanded graphite and exfoliated graphene oxide. More specifically, the present application relates to process for their preparation and uses thereof.

BACKGROUND

Graphene materials have the potential to catalyze the green energy revolution finding many important applications including, but not limited to, energy conversion and energy storage[1]. However, graphene's implementation into applications has been largely limited to lab scale as current methods are associated with a high cost and/or a large quantity of chemical waste generated. With the increasing demand for energy storage materials associated with the rise in demand for portable electronics, electric vehicles, and increasing use of renewable energy[2], it is important to consider the environmental implications associated with the production of these energy materials.

Carbon exists in nature in many different forms, with one particularly interesting form being the naturally abundant allotrope of graphite. Because of a conductive three-dimensional layer structure of two-dimensional sheets of $sp^2$ hybridized carbon atoms, graphite is an excellent candidate for electrochemical exfoliation (ECE) methods[3]. The electrochemical exfoliation of graphite has attracted considerable attention in recent years due the possibility of it being a scalable method to produce graphene-based nanomaterials from graphite. As such, there is a need for alternative methods to produce graphene-based nanomaterials from graphite.

Electrochemical exfoliation has emerged as a promising method for the potential large-scale production of graphene-based nanomaterials from graphite without the necessity for vast quantities of chemical and solvents and high temperatures and with much higher yield[3,4]. ECE is a top-down synthesis method that is continuing to garner attention in the field of two-dimensional nanomaterials. ECE methods are largely limited to conducting or semiconducting layered materials with relatively weak interlayer forces[3]. Along with graphite, ECE has been successfully employed to exfoliate $MoS_2$ crystals into monolayers[5]. The physical structure of graphite lends itself to be an excellent candidate for ECE methods with its' high conductivity and relatively large interplanar distance.

Generally, ECE methods utilize electrochemical processes to overcome interlayer forces, such as Van der Waals forces, to facilitate the production of monolayers of the desired material[4,5]. In general, ionic species in the electrolyte are driven by the applied voltage to intercalate between the graphite sheets[3]. In some methods, the electrolyte species are also reduced to their respective gas within the graphite material, further increasing the interlayer spacing through gas expansion, resulting in an electrochemically exfoliated graphene[3,7,8]. In literature, the ECE of graphite has been reported as a cathode, typically by the insertion of physically large cations such as tert-butyl ammonium salts to increase the interplanar distance and produce graphene-based nanomaterials with a low oxygen content[9]. In anodic ECE methods, anions are attracted to and inserted between graphite layers and are often performed in aqueous media which inevitably introduce oxygen functional groups[4,6]. In both cases, electrochemical processes are used to overcome the Van der Waals forces between the layers of the material while leaving the covalently bound $sp^2$ carbon atoms largely intact.

The ECE is often achieved through the application of a set potential for a given time[9], though this voltage is sometimes reached in a ramp up or in several steps[8]. Alternating currents have also been used for the exfoliation of graphene with a reduced oxygen content[7]. The applied voltage to the graphite material can serve to either electrochemically intercalate or electrochemically exfoliate the graphite[10,11]. The choice of electrolyte and solvent has also been shown to largely influence the properties of the resultant material[6,9]. Most exfoliation methods aim to produce either graphene with minimal defects or a highly oxidized graphene. In the case of defect free graphene, exfoliations often take steps to prevent the introduction of oxygen functional groups through oxygen evolution reaction (OER) related pathways, either by using non-aqueous solutions and/or utilizing graphite as a cathode[9,12]. In the ECE of graphene oxide, the introduction of oxygen is often facilitated through the use of oxidative electrolyte species such $OH^-$, $O_2^-$ and $SO_4^{2-}$ [4,6,10]. The exfoliation of graphite as the anode has been performed in both acidic and alkaline media[6,13].

One consideration is the form of the starting material in ECE methods. The graphite should be in a form that can withstand the conditions of ECE. Graphite rods, graphite foils, and graphite powder have all been used in ECE methods[4,13,14]. The most commonly used form of graphite is the graphite rods. Pre-treatments are sometimes employed to graphite materials in order to facilitate the ECE such as the generation of surface defects as such defects have been found to play a role in certain exfoliation methods[15]. There is also a large energy cost associated with the use of graphite rods as they are produced from graphitized carbonaceous compounds at temperatures around 2500° C.[16].

In the case of graphite powder, extra steps are undertaken to ensure that adequate current is supplied uniformly. This has been achieved through the inclusion of polymeric binders such as polyvinylidene fluoride to form an electrode, which is often used in the battery industry to form a graphite anode[17]. However, the introduction of polymeric binders will inevitably reduce conductivity and likely introduce impurities[17]. Engineering solutions such as the use of compressed porous bags that keep the graphite particles in contact with one another has also been demonstrated[14]. An alternative method to convert graphite powder to a form which can undergo exfoliation is through the expansion of graphite, which can be used to create graphite foils[18]. Expanded graphite is a material that is often studied due to its high thermal conductivity and large surface area, and is often used in the fabrication of materials for automotive and high temperature applications due to its' high thermal conductivity[18,19]. With the relatively large interplanar distance of 0.354 nm, graphite's structure allows for molecules and atoms to be easily inserted between graphene sheets, known as intercalation[3]. This intercalation of species forms the graphite intercalation compound (GIC) and subsequent expansion of the GIC by subjection to thermal energy can result in expanded graphite[19,20]. Through the application of pressure, the expanded graphite can be formed into a variety of shapes which are strong and conductive enough to withstand the exfoliation conditions without the use of binders and avoiding the energy costs associated with the production of graphite rods[16,18].

There is need to provide improved methods for electrochemically converting graphite powder to graphene oxide, being energy efficient, environment friendly, and able to prepare stable graphite foil electrodes without the use of binding agents and with lower chemical consumption.

SUMMARY

It has been surprisingly shown herein that the processes of the present application provide for the production of expanded graphite from natural graphite powder without the use of any binding material. The processes of the present application further provide for expanded graphite foils to be electrochemically exfoliated into graphene oxide in an aqueous electrolyte, without the use of additional organic compounds. Comparable processes did not display the same properties, highlighting the surprising results obtained with the processes of the application.

Accordingly, the present application includes a process for preparing expanded graphite comprising: a) mixing graphite with $H_2SO_4/H_3PO_4$ to form a first mixture; b) adding $KMnO_4$ to the first mixture to form a second mixture; c) adding at least one Fe(III) salt to the second mixture under conditions to form a solid graphite-intercalated compound; d) separating the solid graphite-intercalated compound from the second mixture; and e) heating the solid graphite-intercalated compound under conditions to provide the expanded graphite.

The present application also includes a process for preparing exfoliated graphene oxide comprising: f) compressing expanded graphite to form a flexible graphite foil; g) immersing the flexible graphite foil in a solution comprising at least one alkali metal hydroxide and optionally at least one oxidizing agent, and applying a first voltage; h) removing at least a portion of the flexible graphite foil from the solution; i) re-immersing the flexible graphite foil in the solution and applying a second voltage under conditions to electrochemically exfoliate the flexible graphite foil to provide the exfoliated graphene oxide.

The present application also includes a process for preparing exfoliated graphene oxide comprising: a) mixing graphite with $H_2SO_4/H_3PO_4$ to form a first mixture; b) adding $KMnO_4$ to the first mixture to form a second mixture; c) adding at least one Fe(III) salt to the second mixture under conditions to form a solid graphite-intercalated compound; d) separating the solid graphite-intercalated compound from the second mixture; e) heating the solid graphite-intercalated compound under conditions to provide expanded graphite; f) compressing the expanded graphite to form a flexible graphite foil; g) immersing the flexible graphite foil in a solution comprising at least one alkali metal hydroxide and optionally at least one oxidizing agent, and applying a first voltage; h) removing at least a portion of the flexible graphite foil from the solution; i) re-immersing the flexible graphite foil in the solution and applying a second voltage under conditions to electrochemically exfoliate the flexible graphite foil to provide the exfoliated graphene oxide.

The present application also includes a process for preparing exfoliated graphene oxide comprising: f) compressing expanded graphite to form a flexible graphite foil; and g) immersing the flexible graphite foil in a solution comprising at least one alkali metal hydroxide and optionally at least one oxidizing agent, and applying a voltage under conditions to electrochemically exfoliate the flexible graphite foil to provide the exfoliated graphene oxide.

The present application also includes a process for preparing exfoliated graphene oxide comprising: a) mixing graphite with $H_2SO_4/H_3PO_4$ to form a first mixture; b) adding $KMnO_4$ to the first mixture to form a second mixture; c) adding at least one Fe(III) salt to the second mixture under conditions to form a solid graphite-intercalated compound; d) separating the solid graphite-intercalated compound from the second mixture; e) heating the solid graphite-intercalated compound under conditions to provide expanded graphite; f) compressing the expanded graphite to form a flexible graphite foil; and g) immersing the flexible graphite foil in a solution comprising at least one alkali metal hydroxide and optionally at least one oxidizing agent, and applying a voltage under conditions to electrochemically exfoliate the flexible graphite foil to provide the exfoliated graphene oxide.

The present application also includes exfoliated graphene oxide prepared using the process of the application.

The present application also includes use of an exfoliated graphene oxide prepared by the process of the application, for the manufacture of graphene-based nanomaterials.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF DRAWINGS

The embodiments of the application will now be described in greater detail with reference to the attached drawings in which:

FIG. 1 shows schematic representations of a process known in the art. A) & B) Parallel plate model electrochemical (EC) cell setup with and without basket. C) Vertical model EC cell.

FIG. 2 shows schematic representations of a process known in the art. A) Parallel plate model EC cell setup with graphite powder bag. B) Vertical model EC cell setup with graphite powder.

DETAILED DESCRIPTION

I. Definitions

Figure 3:
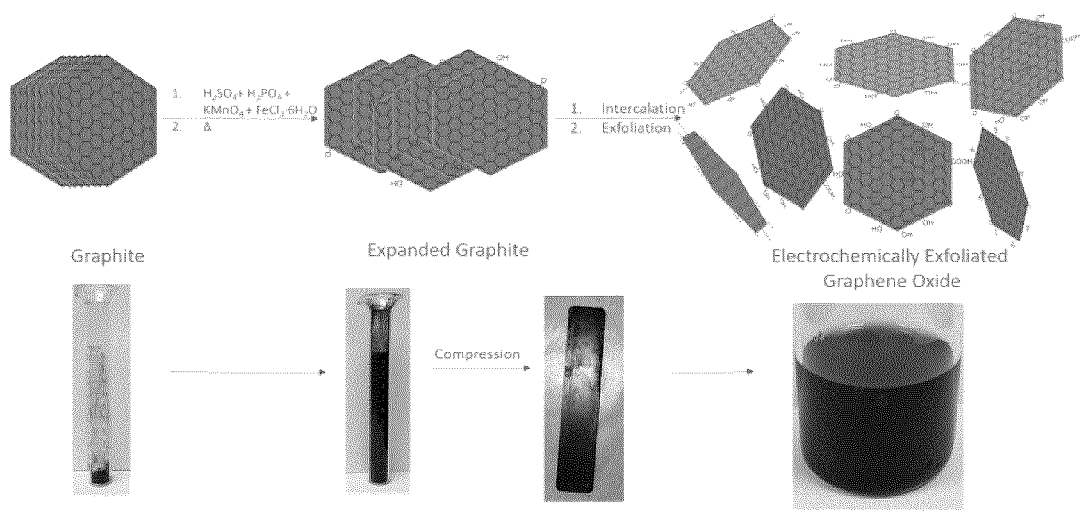
FIG. 3 shows a schematic representation and corresponding photographs of the formation of expanded graphite and subsequent electrochemical exfoliation, according to exemplary embodiments of the present application.

Unless otherwise indicated, the definitions and embodiments described in this and other sections are intended to be applicable to all embodiments and aspects of the present application herein described for which they are suitable as would be understood by a person skilled in the art.

The term "and/or" as used herein means that the listed items are present, or used, individually or in combination. In effect, this term means that "at least one of" or "one or more" of the listed items is used or present.

As used in the present application, the singular forms "a", "an" and "the" include plural references unless the content clearly dictates otherwise.

In embodiments comprising an "additional" or "second" component, such as an additional or second compound, the second component as used herein is chemically different from the other components or first component. A "third" component is different from the other, first, and second components, and further enumerated or "additional" components are similarly different.

As used in this application and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "consisting" and its derivatives as used herein are intended to be closed terms that specify the presence of the stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of these features, elements, components, groups, integers, and/or steps.

The term "suitable" as used herein means that the selection of the particular composition or conditions would depend on the specific steps to be performed, the identity of the components to be transformed and/or the specific use for the compositions, but the selection would be well within the skill of a person trained in the art.

The present description refers to a number of chemical terms and abbreviations used by those skilled in the art. Nevertheless, definitions of selected terms are provided for clarity and consistency.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

The term "aq." as used herein refers to aqueous.

The term "graphite" as used herein refers to the crystalline form of the element carbon with its atoms arranged in a hexagonal layered structure.

The term "expanded graphite" as used herein refers to graphite with an increase of its interlayer space.

The term "graphene oxide" as used herein refers to the oxidized form of graphene. It is a single-atomic-layered material that is formed by the oxidation of graphite, and typically has a thickness of approximately 1 nm.

The terms "exfoliation" or "exfoliated" as used herein refer to a process to convert layered material into a monolayer material or the monolayer material obtained therefrom.

The terms "electrochemical exfoliation" or "electrochemically exfoliated" as used herein refer to an electrochemical process to convert layered material into a monolayer material by applying a voltage to drive ionic species to intercalate between the layers and cause them to dissociate into individual layers, or the monolayer material obtained therefrom.

The term "nanomaterials" as used herein refers to materials having a single unit sized (in at least one dimension) between 1 and 100 nm (nanoscale).

The term "binder" as used herein refers to any suitable substance known in the art to produce or promote cohesion in loosely assembled substances.

II. Processes of the Application

Attempts to efficiently electrochemically exfoliate natural graphite powder to a graphene nanomaterial proved non-trivial. A variety of reported methods and modified methods were employed to electrochemically exfoliate natural graphite to no avail.

Synthesis of graphene oxide (GO) was attempted using an electrochemical approach with a parallel plate and vertical model electrochemical (EC) cell. As shown in FIG. 1A, anode was kept parallel to cathode at a known distance in presence of electrolyte ($H_2SO_4$ or NaOH). In this approach, graphite rod or graphite foil was used as an anode and graphite rod was used as a cathode. For the oxidation of graphite electrode, the DC potential was applied. During the oxidation process, the graphite rod disintegrated into small pieces and fell apart from the solid graphite due to gravity. In the process, very little amount of graphite oxide and majorly graphite particles were produced due to this issue. In order to overcome this issue, the anode was placed in the porous bag wrapped basket as shown in FIG. 1B. However, there was no significant improvement in the process. In the next step, in the vertical model, the anode was kept in the bottom of the cell and cathode placed on top of the cell as illustrated in FIG. 1C. The idea of this approach is to maintain the electrical contact of disintegrated graphite particles with the anode. However, the smaller graphite particles' electrical contact could not be retained to a significant degree due to the gas evolution reaction on the anode surface.

In general, solid graphite electrodes have been used as an anode in electrochemical synthesis of graphene oxide. Binding agents and various pre-treatment process are involved in order to make solid graphite rod or foil. Experiments were performed wherein graphite powder was packed in the expandable porous membrane bag without any binding agents and used as an anode as shown in FIG. 2A. Solid graphite rod was used as a cathode and DC potential was applied between anode and cathode in presence of electrolyte ($H_2SO_4$ or NaOH). This approach only partially oxidized the graphite powder and it was not efficient due to high resistance of the membrane. As a next step, the graphite powder was packed in the bottom of the vertical model electrochemical cell without membrane and binding agents, as shown in FIG. 2B. In which, Pt wire used as contact lead to the anode. DC potential was then applied between anode and cathode for the electrochemical oxidation of graphite. This approach was also not efficient and produced a small amount of partially oxidized graphite and graphene.

It has now been surprisingly shown herein that the processes of the present application provide for the production of expanded graphite from natural graphite powder without the use of any binding material. The processes of the present application further provide for expanded graphite foils to be electrochemically exfoliated into graphene oxide in an aqueous electrolyte, without the use of additional organic compounds. Comparable processes did not display the same properties, as described above, highlighting the surprising results obtained with the processes of the application.

Processes for Preparing Expanded Graphite

Accordingly, the present application includes a process for preparing expanded graphite comprising: a) mixing graphite with $H_2SO_4/H_3PO_4$ to form a first mixture; b) adding $KMnO_4$ to the first mixture to form a second mixture; c) adding at least one Fe(III) salt to the second mixture under conditions to form a solid graphite-intercalated compound; d) separating the solid graphite-intercalated compound from the second mixture; and e) heating the solid graphite-intercalated compound under conditions to provide the expanded graphite.

In some embodiments, the mixing of graphite with $H_2SO_4/H_3PO_4$ to form a first mixture in a) is carried out at a temperature of about 0° C. to about 40° C. In some embodiments, the temperature is about 0° C. to about 30° C., or about 0° C. to about 20° C., or about 0° C. to about 10° C. In some embodiments, the mixing is carried out for an appropriate time to achieve suitable mixing, for example for about 1 to about 5 minutes. In some embodiments, the mixing is carried out for about 1 to about 4 minutes, or about 1 to about 3 minutes, or about 2 to about 4 minutes, or about 3 to about 5 minutes.

In some embodiments, the $H_2SO_4/H_3PO_4$ is present in a ratio of at least 10:1 mL:grams of graphite. For example, the step includes mixing n grams of graphite with about 10*n to about 20*n mL of $H_2SO_4/H_3PO_4$. In some embodiments, the $H_2SO_4/H_3PO_4$ is present in a volume ratio of $H_2SO_4$:$H_3PO_4$ of 10-x:x, where x is equal to 0.1 to 4.

In some embodiments, the adding of $KMnO_4$ to the first mixture to form a second mixture in b) is carried out at a temperature of about 0° C. to about 40° C. In some embodiments, the temperature is about 0° C. to about 30° C., or about 0° C. to about 20° C., or about 0° C. to about 10° C. In some embodiments, the $KMnO_4$ is mixed with the first mixture for an appropriate time to achieve suitable mixing, for example about 30 minutes to 3 hours. In some embodiments, the $KMnO_4$ is mixed for about 30 minutes to about 2 hours, or about 30 minutes to about 1 hour.

In some embodiments, the $KMnO_4$ is present in a ratio (w/w) of about 1:1 to about 4:1 $KMnO_4$:graphite. In some embodiments, the $KMnO_4$ is present in a ratio (w/w) of about 1:1 to about 3:1, or about 1.5:1 to about 2.5:1, or about 2:1 $KMnO_4$:graphite.

In some embodiments, the adding of at least one Fe(III) salt to the second mixture under conditions to form a solid graphite-intercalated compound in c) is carried out at a temperature of about 0° C. to about 40° C. In some embodiments, the temperature is about 0° C. to about 30° C., or about 0° C. to about 20° C., or about 0° C. to about 10° C. In some embodiments, the conditions to form a solid graphite-intercalated compound comprise a time suitable to form a solid graphite-intercalated compound, for example about 30 minutes to about 3 hours. In some embodiments, the time suitable to form a solid graphite-intercalated compound is about 30 minutes to about 2 hours, or about 45 minutes to about 1.5 hours, or about 1 hour.

In some embodiments, the at least one Fe(III) salt is selected from $FeCl_3$, $Fe(NO_3)_3$ and $Fe_2(SO_4)_3$ and their hydrates. In some embodiments, the Fe(III) salt is $FeCl_3 \cdot 6H_2O$. In some embodiments, the at least one Fe(III) salt is present in a ratio (w/w) of about 0.25:1 to about 2:1, Fe(III) salt:graphite. In some embodiments, the at least one Fe(III) salt is present in a ratio (w/w) of about 0.25:1 to about 1.5:1, or about 0.5:1 to about 1:1, Fe(III) salt:graphite.

In some embodiments, the solid graphite-intercalated compound is separated from the second mixture in d) using centrifugation or filtration. Any suitable separation methods known in the art may be used.

In some embodiment, the process further comprises rinsing and/or drying the graphite-intercalated compound prior to the heating in e). In some embodiments, the drying is carried out at a temperature of about 30° C. to about 70° C., or about 40° C. to about 60° C., or about 45° C. to about 55° C. In some embodiments, the drying is carried out for a time suitable to dry the graphite-intercalated compound, for example from about 12 hours to about 48 hours, or about 18 hours to about 36 hours, or about 24 hours.

In some embodiments, the heating the solid graphite-intercalated compound under conditions to provide the expanded graphite in e) is carried out at a temperature of about 350° C. to about 800° C. In some embodiments, the heating is carried out at a temperature of about 400° C. to about 750° C., or about 450° C. to about 700° C., or about 500° C. to about 700° C., or about 550° C. to about 700° C., or about 600° C. to about 650° C. In some embodiments, the heating is carried out for a time suitable to provide the expanded graphite, for example about 30 seconds to about 3 hours. In some embodiments, the heating is carried out for is about 1 minute to about 2 hours, or about 3 minutes to about 1 hour, or about 3 minutes to about 30 minutes. A skilled person in the art would appreciate that the time of the heating step will depend on the applied temperature.

In some embodiments, the graphite is powder graphite. In some embodiments, the graphite is natural powder graphite.

In some embodiments, the expanded graphite has an about 20 to about 100 times expansion volume from the graphite. In some embodiments, the expanded graphite has an about 30 to about 80 times expansion volume from the graphite.

In some embodiments, the expanded graphite is prepared in the absence of binder. As such, in some embodiments, the process of the application avoids the use of large quantity of chemicals and thus reduces associated chemical wastes generated. Consequently, in some embodiments, the process of the application is an energy efficient and more environmentally-friendly process, especially for wide-scale implementation. Stable expanded graphite is thus efficiently prepared.

Processes for Preparing Exfoliated Graphene Oxide

The present application also includes a process for preparing exfoliated graphene oxide comprising: f) compressing expanded graphite to form a flexible graphite foil; g) immersing the flexible graphite foil in a solution comprising at least one alkali metal hydroxide and optionally at least one oxidizing agent, and applying a voltage under conditions to electrochemically exfoliate the flexible graphite foil to provide the exfoliated graphene oxide. In some embodiments, step g) comprises immersing the flexible graphite foil in the solution, and applying a first voltage; removing at least a portion of the flexible graphite foil from the solution; re-immersing the flexible graphite foil in the solution and applying a second voltage under conditions to electrochemically exfoliate the flexible graphite foil to provide the exfoliated graphene oxide.

In some embodiments, the compressing of the expanded graphite to form a flexible graphite foil in f) is done through conventional methods, such as by application of pressure through hydraulic press in a mold or using a rolling press. However, any suitable method within the purview of the skilled person may be used for compressing the expanded graphite.

In some embodiments, the graphite foil serves as the anode in the electrochemical process. In some embodiments, a suitable cathode is selected, for example, from platinum, titanium and graphite, but may be of any material known to those skilled in the art. In some embodiments, an external power supply is provided to apply suitable voltage to the anode.

In some embodiments, the at least one alkali metal hydroxide is selected from NaOH, LiOH, KOH and mixtures thereof.

In some embodiments, the optional oxidizing agent is selected from $H_2O_2$. In some embodiments, the oxidizing agent is present.

In some embodiments, the first voltage, when used, is about +0.1 to about +3 V. In some embodiments, the first voltage is about +0.2 to about +2.8 V, or about +0.5 to about +2.5 V, about +1 to about +2 V. In some embodiments, applying the first voltage is carried out for a period of time of about 5 to about 30 minutes. In some embodiments, applying the first voltage is carried out for a period of time of about 5 to about 20 minutes, or about 5 to about 10 minutes, or about 10 to about 20 minutes.

In some embodiments, the removing at least a portion of the flexible graphite foil from the solution, when used, is carried to completely remove the flexible graphite foil. In some embodiments, removing at least a portion of the flexible graphite foil from the solution is carried to retain a portion of the flexible graphite foil in the solution. In some embodiments, the portion of the flexible graphite foil retained in the solution is from about 0.1% to about 50% of the total length of the flexible graphite foil. In some embodiments, the retained portion of the flexible graphite foil is from about 0.2% to about 40%, or from 0.3% to about 30%, or about 0.4% to about 20%, or about 0.5% to about 10% of the total length of the flexible graphite foil. A skilled person in the art would appreciate that the portion retained will depend on the electrolyte, the applied voltage, and the speed of the exfoliation and this would be well within the purview of the skilled person.

In some embodiments, the second voltage or the voltage to electrochemically exfoliate the flexible graphite foil to provide the exfoliated graphene oxide is greater than +3 V. In some embodiments, the immersing or re-immersing is carried out gradually. In some embodiments, the second voltage or the voltage to electrochemically exfoliate the flexible graphite foil to provide the exfoliated graphene oxide is greater than +3 V to about +100 V, or greater than +3 V to about +10 V, greater than +3 V to about +8 V, or greater than +3 V to about +5 V. A skilled person would appreciate that the applied voltage will depend on the concentration of the electrolyte and the rate of the exfoliation. For example, the lower the concentration of the at least one alkali metal hydroxide, the higher the voltage that is needed.

In some embodiments, the electrochemically exfoliated graphene oxide has an oxygen content of about 15% to about 30%. In some embodiments, the electrochemically exfoliated graphene oxide has an oxygen content of about 15% to about 28%, or about 18% to about 25%, or about 20% to about 25%.

In some embodiments, the electrochemical exfoliation is carried out in aqueous solution, without the use of an organic media. As such, in some embodiments, the process of the application avoids the use of large quantities of chemicals and thus reduces associated chemical wastes generated. Consequently, in some embodiments, the process of the application represents a greener and more environmentally-friendly process, especially for wide-scale implementation.

The present application further includes a process for preparing exfoliated graphene oxide comprising: a) mixing graphite with $H_2SO_4/H_3PO_4$ to form a first mixture; b) adding $KMnO_4$ to the first mixture to form a second mixture; c) adding at least one Fe(III) salt to the second mixture under conditions to form a solid graphite-intercalated compound; d) separating the solid graphite-intercalated compound from the second mixture; and e) heating the solid graphite-intercalated compound under conditions to provide the expanded graphite; f) compressing the expanded graphite to form a flexible graphite foil; g) immersing the flexible graphite foil in a solution comprising at least one alkali metal hydroxide and optionally at least one oxidizing agent, and applying a voltage under conditions to electrochemically exfoliate the flexible graphite foil to provide the exfoliated graphene oxide. In some embodiments, step g) comprises immersing the flexible graphite foil in the solution, and applying a first voltage; removing the flexible graphite foil from the solution; re-immersing the flexible graphite foil in the solution and applying a second voltage under conditions to electrochemically exfoliate the flexible graphite foil to provide the exfoliated graphene oxide.

In some embodiments, the process of the present application allows for the preparation of stable graphite foils using a unique electrochemical protocol. Briefly, the graphite is first intercalated by a chemical process and subsequently thermally expanded to form expanded graphite (EPG). The EPG is then compressed to a thin foil and electrochemically exfoliated to form electrochemically exfoliated graphene oxide (EGO).

In other electrochemical methods, reported in literature, binding agents or energy intensive process are used to prepare electrodes to conduct electrochemical exfoliation [16]. Furthermore, electrochemical methods utilizing powder graphite as an electrode have not been scalable due to the smaller yield, longer process, poor electrical contact etc.[17]. The fabrication of graphene oxide is typically achieved through the chemical oxidation of graphite which can be further processed to for variety of graphene-based nanomaterials. Methods such as the Hummers and Marcano methods suffer the generation of vast quantities of chemical waste and uncontrollable oxidation/defect generation[21].

In some embodiments of the process of the present application, graphite powder is treated with fewer chemicals and a heat treatment to prepare expanded graphite with about 20-100, or about 30-80 times expansion volume. The present application thus provides expanded graphite pressed without any binders/additives to prepare stable electrodes and a facile protocol to conduct efficient electrochemical oxidation to produce graphene oxide. Prior art methods use energy intensive processes and binders to prepare and process stable electrodes for electrochemical exfoliation. Also, uncontrollable chemical oxidation uses vast quantity of harsh chemicals. The present application thus provides facile preparation of electrodes as well as controllable electrochemical processes to produce graphene oxide.

In some embodiments, any of the steps described herein may be automated such that the reaction parameters are monitored, and actions are controlled according to predetermined settings. In some embodiments, step of immersing the flexible graphite foil in the solution and applying a voltage under conditions to electrochemically exfoliate the flexible graphite foil to provide the exfoliated graphene oxide is automated. For example, the immersion can be controlled by a computer, the computer controlling movement of the graphite foil by sensing whether or not there is a current. Further the computer can be connected to a movement mechanism to adjust the position of the graphite foil in the solution to allow all of the foil to be exfoliated and finally removed. Any methods known in the art for automation, controlling, monitoring, etc. may be used and this would be well within the purview of a skilled person.

The present application also includes graphene oxide as described in any aspect or embodiment herein. In some embodiments, the graphene oxide is as prepared according to any process of any previous aspect and embodiment herein. In embodiments, the graphene oxide is as characterized according to any one of the figures.

III. Uses of the Application

The processes of the application have been shown to provide stable expanded graphite.

Accordingly, the present application includes use of the expanded graphite in a process for preparing exfoliated graphene oxide.

The present application further provides use of the exfoliated graphene oxide for the manufacture of nanomaterials. In some embodiments, the nanomaterials are used as energy storage materials such as in portable electronic devices, electric vehicle, etc., sensing materials, such as fluorinated derivatives that can be used for heavy metal sensing, energy conversion materials, such as an electrocatalyst in water splitting applications, etc.

EXAMPLES

The following non-limiting examples are illustrative of the present application.

General Methods

High-purity graphite powder (Albany graphite deposit) is provided by ZEN Graphene Solutions Ltd. Sulfuric acid (98%), iron (III) chloride hexahydrate (99.9%), sodium hydroxide (99%) and hydrogen peroxide (30%) were purchased from Sigma-Aldrich (Canada) and used as received. Analytical grade reagents (phosphoric acid (85%), potassium permanganate (≥99.0%)) are used as received without further purification. Pure water (18.2 MΩ cm, Nanopure® Diamond™ UV water purification system) is used for aqueous solution preparation. The source graphite is a highly crystalline igneous-hosted graphite from the Albany graphite deposit in northeastern Ontario.

Example 1—Expanded Graphite (EPG)

Graphite (1.00 g) is combined with sulfuric acid (15 ml, 98% w/w) and phosphoric acid (4 ml, 85% w/w), and the resultant reaction mixture is magnetically stirred at 0° C. with an ice bath. Potassium permanganate (2.00 g) is then added to the reaction mixture, which is subsequently stirred for ~30 min, after which iron (III) chloride hexahydrate (0.50 g) is added with the reaction mixture then being stirred for an additional 1 h. The reaction mixture is then separated by successive centrifugation, with the sedimented material being collected and dried in an oven at 50° C. for ~24 h. The dark grey, dry, and crumbly graphite intercalated compound is then loaded into a crucible (alumina, porcelain, etc.) and is placed into a muffle furnace set to 640° C. for 3 minutes. After the rapid heat treatment, the graphitic material appears as a light, fluffy, black powder called expanded graphite.

Example 2—Electrochemically Exfoliated Graphene Oxide (EGO)

The expanded graphite from Example 1 is then compressed into thin 5.0 cm×1.0 cm foils with varying thickness, by application of pressure through a hydraulic press in a stainless-steel mold. The resultant graphite foils appear as shiny metallic strips. In a typical electrochemical exfoliation, the newly formed graphite foils are used as an anode through connection to an external power supply with a platinum mesh being used as a cathode. With the electrodes submersed in an electrolyte containing sodium hydroxide and hydrogen peroxide, a voltage of <+3 V is applied to the graphite anode for a period. The graphite foil anode is then partially removed from the electrolyte, and while a voltage of +>3 V is applied, it is slowly lowered into the electrolyte, consuming the electrode and resulting in electrochemically exfoliated graphene oxide (EGO).

Example 3—Automatic Electrochemically Exfoliated Graphene Oxide (auto-EGO)

Following the compression of the expanded graphite to thin foils from Example 1, the introduction of the expanded graphite foils to the electrolyte can be controlled automatically. In one embodiment, the system is built upon the Arduino architecture, with a dedicated hull-effect sensor providing signal to the main microcontroller overseeing the reaction parameters. A custom elevator is designed and fabricated using a leadscrew and stepper motor to translate rotational motion of the motor into linear translation of the anode platform. In a typical experiment, the anode is aligned with the cell, and the experiment is initiated through software. The elevator continuously lowers the electrode until the circuit is established and a specified minimum current is obtained. The exfoliation begins as soon as a connection between the electrode and the electrolyte is made. With the electrode area degrading as the graphite layers are liberated, the current decreases proportionally to the lowered electrode area, and therefore generates a signal to lower the elevator and expose fresh electrode into the electrolyte. The length of the fabricated electrode can be used as the program termination condition, where if the length of the accessible area of the electrode is reached, the elevator would raise to a safe level and hold until the next process.

Comparative Example—Chemically Produced Graphene Oxide (CGO)

To compare characteristics of the EGO, chemically produced graphene oxide (CGO) is synthesized using a variant of the Hummers method[27], in which natural graphite (2.00 g) is combined with 200 ml of 9:1 sulfuric acid/phosphoric acid (v/v) and stirred for 2 h, after which and potassium permanganate (9.00 g) is added. The mixture was then further stirred for 15 h and subsequently placed in an ice bath, followed by the addition of 30% $H_2O_2$ (2.5 ml). The CGO is then washed with hydrochloric acid and ethanol and collected by centrifugation.

Results

The surface morphology and elemental composition were probed by field emission-scanning electron microscopy (FE-SEMO (Hitachi SU-70) with attached EDX detector with ±0.1 at. %. Raman spectra were obtained by use of Renishaw™ Raman spectrometer at 50× magnification with a λ=532 nm laser source. X-ray spectra were obtained by use of a Panalytical™ PW1050-3710 diffractometer with Cu Kα (λ=1.5405 Å) as an X-ray source. Infrared spectroscopy was performed with a Thermo Scientific FTIR spectrometer. Electrochemical studies were performed by cyclic voltammetry with a CHI 660E potentiostat with a three-electrode cell and 0.5 M $H_2SO_4$ was used as the electrolyte. A glassy carbon electrode (GCE; surface area=0.07 cm2) was modified with the active materials and utilized as the working electrode with a $Hg/HgSO_4$ and polycrystalline platinum wire being used as the reference and counter electrodes respectively for capacitance studies. Active materials were dispersed in 675 μl pure water, 300 μl ethanol and 25 μl of Nafion™ per fluorinated resin solution (20 wt. %), and 3.0 μl was drop-cast onto a clean GCE. The prepared GCEs were then allowed to dry overnight before performing the electrochemical studies.

Discussion

FIG. 3 shows a schematic representation and corresponding photographs of the formation of expanded graphite and subsequent electrochemical exfoliation, according to exemplary embodiments of the present application.

Figure 4:
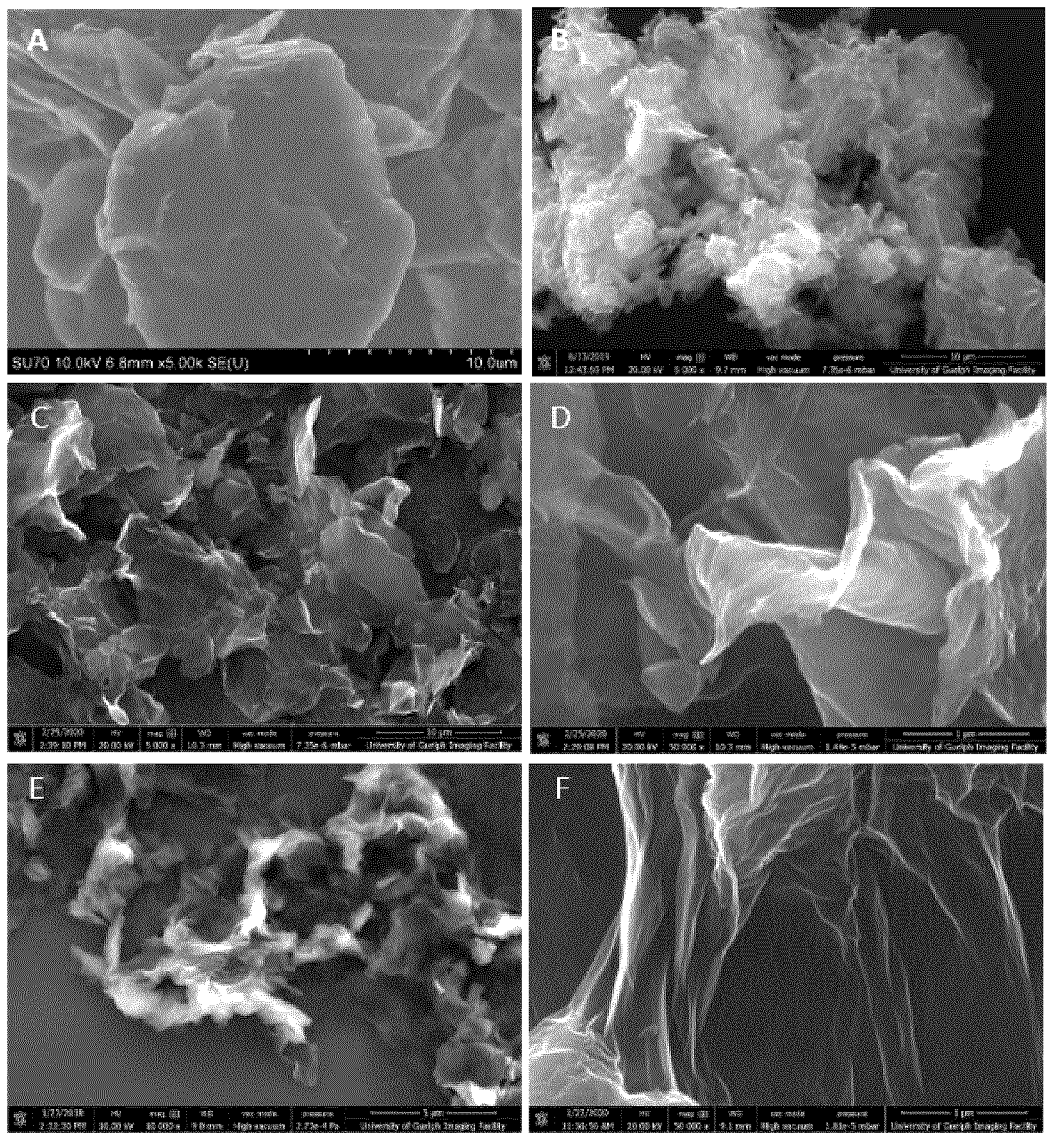
FIG. 4 shows FE-SEM images of natural graphite before expansion (A) 5000×, after expansion (EPG) (B) 5000×, along with electrochemically exfoliated graphene oxide (EGO) at 5000× (C) and 50,000× (D), and chemically produced graphene oxide (CGO) at 5000× (E) and 50,000× (F), all prepared using exemplary embodiments of the processes of the application.

FIGS. 4A&B shows the FE-SEM image of the graphite before and after the expansion procedure displaying the drastic changes to the morphology of the material during the expansion process. FIG. 4A shows the flaky structure of graphite. After expansion FIG. 4B shows the worm-like structure. This confirms the increased interlayer-distance of graphite. FIGS. 4C&D shows the SEM images of EGO after the electrochemical process appears as a collection of thin crumpled sheets. The crumpled sheet morphology suggesting that the exfoliation process introduced oxygen-containing functional groups caused the crumple morphology of the material. Further, FIGS. 4E&F shows the morphology of CGO at same magnification as EGO looks similar.

Table 1 displays the results of the energy-dispersive X-ray spectroscopy (EDS) of graphite, EPG, EGO and CGO. The oxygen present in the expanded graphite is 7.4 at. %, and suggests that expansion process did not oxidize the graphite extensively. The main role of the expansion process is to increase the interlayer distance without affecting the graphite's chemical nature. From the composition of EPG it is evident that the chemical nature of graphite was not significantly altered after expansion. After the electrochemical exfoliation process, the oxygen content is increased to 26.7%, suggesting the introduction of more oxygen-containing functionalities introduced. The CGO's EDS chemical composition has slightly higher oxygen percent than the EGO.

TABLE 1

| Material | Atomic. % | | |
|---|---|---|---|
| | Carbon | Oxygen | Other |
| Graphite | 100.0 | 0.0 | 0.0 |
| EPG | 91.9 | 7.4 | 0.6 |
| EGO | 69.2 | 26.7 | 4.3 |
| CGO | 65.6 | 35.4 | 0.0 |

Figure 5:
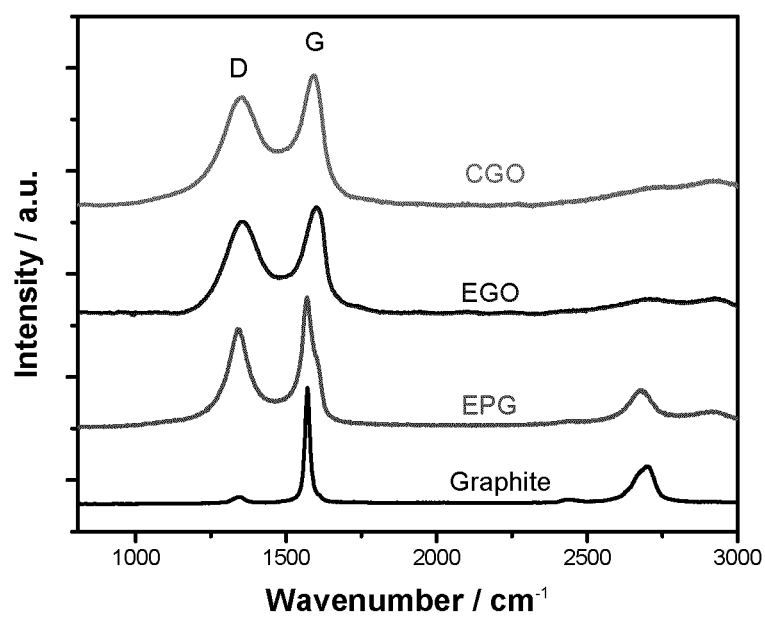
FIG. 5 shows Raman spectra of graphite, EPG, EGO, and CGO all prepared using exemplary embodiments of the processes of the application.

FIG. 5 shows the Raman spectra of Graphite, EPG, EGO and CGO. Raman spectra shows three characteristic bands D, G and 2D at ~1360, ~1560 and ~2700 $cm^{-1}$, respectively. The appearance of D band is from the disorder triggered scattering arising from imperfections in the hexagonal structure of graphite. Further it is well known that G band is originated from vibration of $sp^2$-carbon or $E_{2g}$ mode of graphite[22]. The relative intensities of D and G band can give useful information about the surface defects present in the graphene material with a higher ratio of $I_D/I_G$ being indicative of a higher defect density[22]. When comparing the Raman spectra of the produced EGO to the graphite and EPG in FIG. 5, there are some key differences. Notably, the $I_D/I_G$ increases significantly after the expansion process and increases even further after the ECE process. As the $I_D/I_G$ is indicative of surface defects, this can be explained by the introduction of defects during the expansion process and exfoliation process[23]. Also, there is change in the 2D band (2700 $cm^{-1}$) that is the intensity of 2D band is reduced after expansion and further reduced after electrochemical exfoliation process. The reduction of 2D band intensity can be explained as the introduction of defects suppressing the lattice vibration mode associated with the 2D peak[24]. In addition, decrease in intensity of 2D band indicates the exfoliation of graphite. The expanded graphite's reduced 2D band indicates its expansion and graphitic nature. Further, the EGO shows a broadened, small hump-like 2D band that indicates the functionalization of graphite and it is characteristic of graphene oxide. Raman spectra of the EGO are well aligned with CGO.

Figure 6:
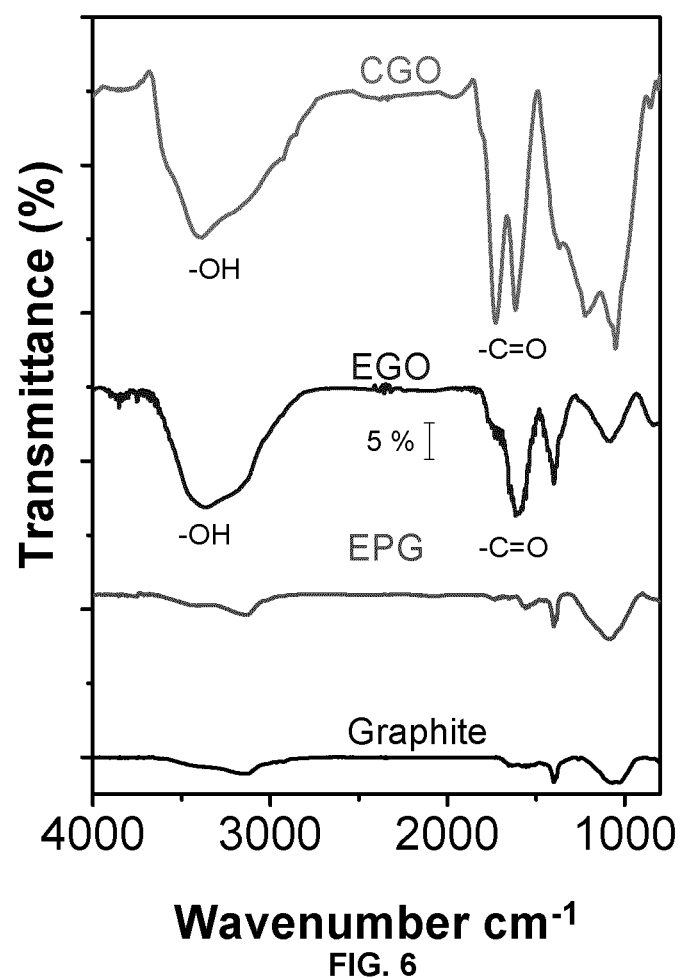
FIG. 6 shows infrared spectra of graphite, EPG, EGO and CGO all prepared using exemplary embodiments of the processes of the application.

Fourier transform infra-red spectra (FT-IR) is used to confirm the type of oxygen-containing functional groups that are introduced at different stages of the process. FIG. 6 presents the FT-IR spectra of graphite, EPG, EGO and CGO. FT-IR spectra of graphite and EPG looks similar. The increase in the intensity of the functional groups in not noticeable in EPG. The FT-IR spectra of EGO suggests the introduction of oxygen-containing functionalities are introduced after the ECE process. The presence of the large broad peak around ~3300 $cm^{-1}$ is characteristic of —OH stretching, while the presence of the peak around ~1700 $cm^{-1}$ is characteristic of carbonyl stretching[25]. The introduction of hydroxyl and carbonyl stretching after the exfoliation process suggests that many of these functionalities were generated in the exfoliation process. For comparison FT-IR spectra of CGO is included, which shows slightly increased in variety and proportion of functional groups in contrast to EGO.

Figure 7:
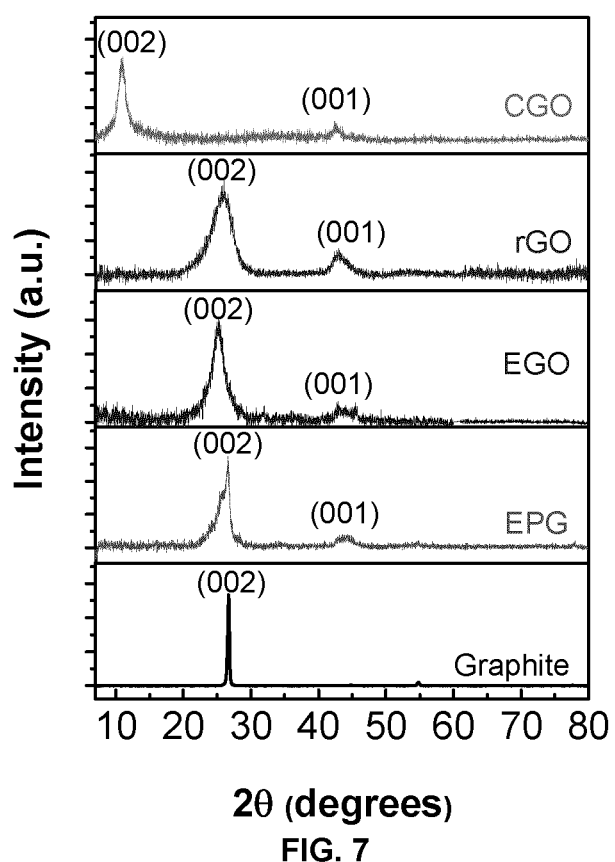
FIG. 7 shows XRD spectra of graphite, EPG, EGO, rGO, and CGO all prepared using exemplary embodiments of the processes of the application.

FIG. 7 presents the X-ray diffraction pattern of graphite, EPG, EGO and CGO. XRD spectra of graphite shows typical diffraction pattern with two distinct peaks corresponding to hexagonal 0 0 2 plane and 1 0 0 basal plane at $2\Theta$~26.6° and ~42.0°. In comparison, EPG shows broad diffraction peak at lower $2\Theta$=26.0°, this is as a result of increased inter-layer spacing due to the intercalation and thermal exfoliation. After the chemical oxidation of graphite to CGO, this typically results in the shifting of the (002) plane peak in the XRD spectra to shift to ~10° $2\theta$ from ~26° $2\theta$[26]. In contrast, the XRD pattern of EGO shows a weak and broader 0 0 2 peak at 25.0° which indicates there are clear differences in peak position. In the electrochemical process, the 0 0 2 is peak becomes weaker and broader, and indicates the oxidation. Since the XRD pattern of EGO is featureless or very weak like graphene, so the expected (002) peak around ~10° was not noticeable. The peak position of EGO can be comparable to the reduced graphene oxide (rGO) ($2\theta$=25.7°). From the peak position, the inter-layer distance (d spacing) is estimated to be 0.337, 0.341, 0.356, 0.347 and 0.807 nm for graphite, EPG, EGO, rGO and CGO, respectively. Further, the crystallite size in c axis ($L_c$) is estimated from the FWHM to be 24.0, 3.48, 2.73, 2.14 and 4.48 nm for graphite, EPG, EGO, rGO and CGO, respectively. The number of layers present is estimated using $L_c$ and d spacing to be 72, 11, 9, 7 and 7 for graphite, EPG, EGO, rGO and CGO, respectively.

Figure 8:
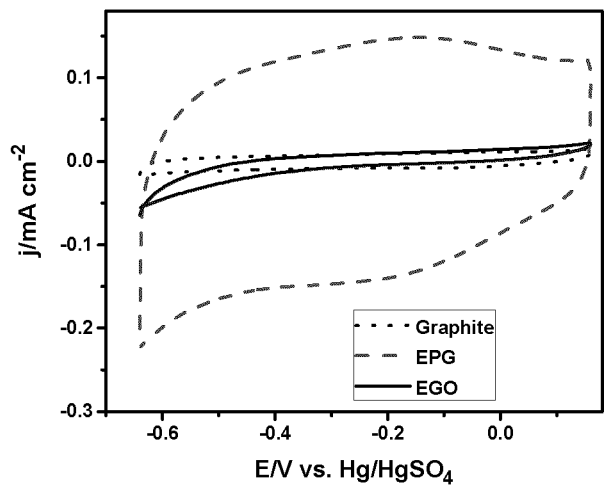
FIG. 8 shows cyclic voltammograms of graphite, EPG and EGO in 0.5 M $H_2SO_4$, each prepared using exemplary embodiments of the processes of the application.

Electrochemical properties such as electrochemical capacitance and heterogenous electron transfer (HET) ability using potassium ferrocyanide redox probe were investigated. FIG. 8 displays the electrochemical capacitance cyclic voltammograms of graphite, EPG and EGO conducted in 0.5 M $H_2SO_4$ at 50.0 mV $s^{-1}$. Area of the cyclic voltammogram can be related to the electrochemical capacitance. Capacitance of graphite is too small; this can correspond to its low surface area. After expansion EPG showed a significantly greater capacitance compared to graphite and EGO, this may be attributed to increased surface area due to the increased inter-layer spacing. One possible reason for the high capacitance of the expanded graphite is the large, conductive surface area. Further, EGO has exhibited small capacitance this may be attributed to its poor conductivity due to the introduction of oxygen-containing functional groups. This can be explained through the reduced conductivity due to the introduction of defects in the form of oxygen-containing functional groups and is comparable to chemically produced graphene oxide[27].

Figure 9:
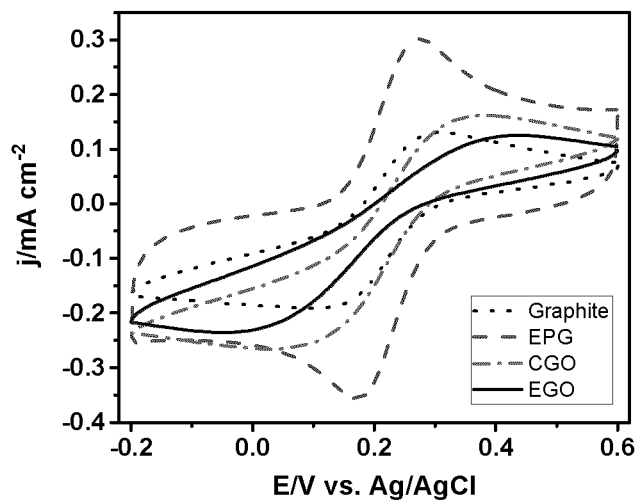
FIG. 9 shows cyclic voltammograms of graphite, EPG, CGO and EGO in 0.1 M KCl+5 mM $K_3[Fe(CN)_6]$ each prepared using exemplary embodiments of the processes of the application.

After that, HET studies were performed in 0.1 M KCl with 5 mM $K_3[Fe(CN)_6]$ and the potential measured with respect to Ag/AgCl reference electrode, as shown in FIG. 9. The difference between the oxidation and reduction peak potentials ($\Delta E_p$) is an indicator of electron transfer—as the difference increases, the rate of electron transfer is slower and vice versa. The $\Delta E_p$ of graphite, EPG, EGO and CGO found to be 182, 104, 450 and 347 mV, respectively. EPG exhibits faster HET compared to graphite, EGO and CGO. This can be attributed to its high conductivity and larger surface area. Graphite exhibits faster HET compared to EGO and CGO. This may be due to the high conductivity of graphite compared to EGO and CGO. The reduced conductivity in the EGO and the CGO is also likely responsible for the blocking of the ferricyanide response, as the introduction of functional groups and defects slows the rate of electron transfer.

Figure 10:
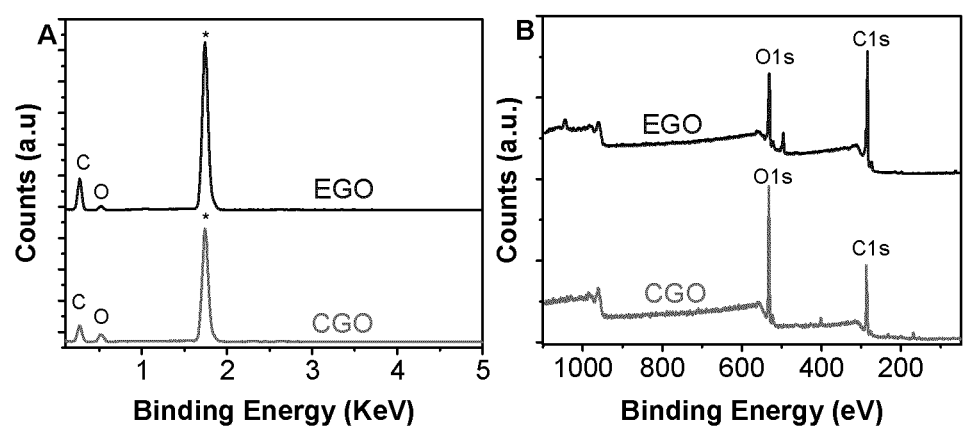
FIG. 10 shows spectra for CGO and EGO each prepared using exemplary embodiments of the processes of the application: (A) energy dispersive X-ray (EDX) spectra of CGO and EGO; (B) survey X-ray photoelectron spectra of CGO and EGO. The star (*) in FIG. 10A indicates the peak was derived from the Si substrate.

FIGS. 10A and 10B display the EDX spectra and the XPS spectra of the electrochemically exfoliated graphene oxide (EGO) and the chemically derived analogue (CGO), showing that both EGO and CGO have the similar composition of carbon and oxygen.

Figure 11:
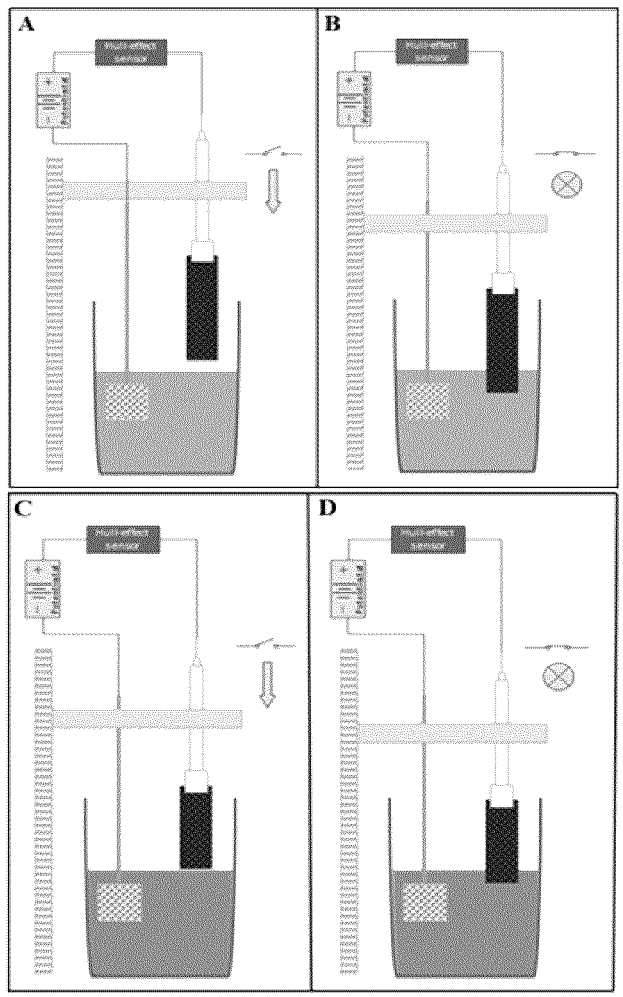
FIG. 11 shows an automatic electrochemical exfoliation (ECE) system according to exemplary embodiments of the processes of the application: (A) before ECE; (B) immersion of a fraction of the electrode; (C) the immersed portion was exfoliated; (D) immersion of a fraction of the electrode again.

FIG. 11 illustrates the working principle of an automatic ECE system of Example 3. Whereby the circuit is open, and the device is lowered until it completes the circuit by touching the electrolyte. A fraction of the electrode is immersed in the electrolyte and the current for the electrochemical exfoliation is monitored. When the exfoliation consumes the immersed portion of the electrode, the current is rapidly decreased to the set onset of current and triggers the device to lower a specified portion into the electrolyte. This process is repeated until the electrode is fully exfoliated.

Figure 12:
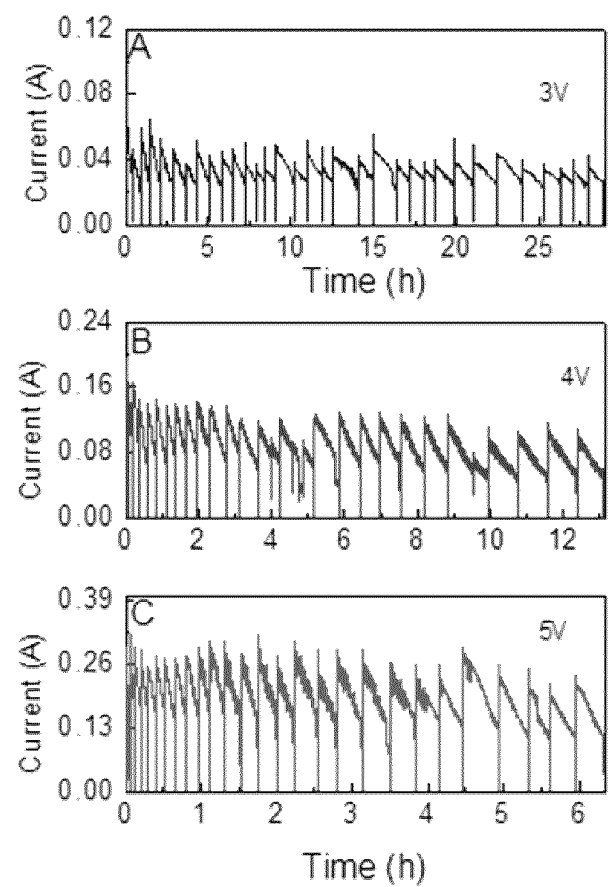
FIG. 12 shows current and time plots recorded in 1.0 M NaOH during the electrochemical exfoliations at the applied voltage of: (A) 3.0 V, (B) 4.0 V, and (C) 5.0 V, according to exemplary embodiments of the processes of the application.

FIG. 12 displays the typical current vs. time plots of an expanded graphite foil which was electrochemically exfoliated using the automatic ECE device of Example 3. With the increase of the applied voltage from 3.0 V to 5.0 V, the current was increased. As a result, the overall exfoliation time was decreased accordingly.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

REFERENCES

[1] A. T. Smith, A. M. LaChance, S. Zeng, B. Liu, L. Sun, *Nano Mater. Sci.* 2019, 1, 31.
[2] S. Isah, *Asian J. Nanosci. Mater.* 2018, 2, 90.
[3] A. M. Abdelkader, A. J. Cooper, R. A. W. Dryfe, I. A. Kinloch, *Nanoscale* 2015, 7, 6944.
[4] S. Pei, Q. Wei, K. Huang, H.-M. Cheng, W. Ren, *Nat. Commun.* 2018, 9, 145.
[5] A. Ambrosi, M. Pumera, *Chem.—A Eur. J.* 2018, 24, 18551.
[6] K. S. Rao, J. Senthilnathan, Y.-F. Liu, M. Yoshimura, *Sci. Rep.* 2015, 4, 4237.

[7] S. Yang, A. G. Ricciardulli, S. Liu, R. Dong, M. R. Lohe, A. Becker, M. A. Squillaci, P. Samorì, K. Müllen, X. Feng, *Angew. Chemie Int. Ed.* 2017, 56, 6669.
[8] F. Pogacean, M. Coros, L. Magerusan, V. Mirel, A. Turza, G. Katona, R.-I. Stefan-van Staden, S. Pruneanu, *Talanta* 2019, 196, 182.
[9] Y. Yang, F. Lu, Z. Zhou, W. Song, Q. Chen, X. Ji, *Electrochim. Acta* 2013, 113, 9.
[10] J. Liu, H. Yang, S. G. Zhen, C. K. Poh, A. Chaurasia, J. Luo, X. Wu, E. K. L. Yeow, N. G. Sahoo, J. Lin, Z. Shen, *RSC Adv.* 2013, 3, 11745.
[11] M. Armand, P. Touzain, *Mater. Sci. Eng.* 1977, 31, 319.
[12] J. Stafford, A. Patapas, N. Uzo, O. K. Matar, C. Petit, *AIChE J.* 2018, 64, 3246.
[13] M. Coroş, F. Pogăcean, M.-C. Roşu, C. Socaci, G. Borodi, L. Mageruşan, A. R. Biriş, S. Pruneanu, *RSC Adv.* 2016, 6, 2651.
[14] T. C. Achee, W. Sun, J. T. Hope, S. G. Quitzau, C. B. Sweeney, S. A. Shah, T. Habib, M. J. Green, *Sci. Rep.* 2018, 8, 14525.
[15] C.-T. Hsieh, J.-H. Hsueh, *RSC Adv.* 2016, 6, 64826.
[16] S.-M. Lee, D.-S. Kang, J.-S. Roh, *Carbon Lett.* 2015, 16, 135.
[17] X. Zhao, S. Niketic, C. H. Yim, J. Zhou, J. Wang, Y. Abu-Lebdeh, *ACS Omega* 2018, 3, 11684.
[18] A. Celzard, S. Schneider, J. F. Marêché, *Carbon N. Y.* 2002, 40, 2185.
[19] Y. F. Yang, X. J. Zhang, X. Xu, in *Adv. Mater. Res.,* 2011, pp. 2695-2698.
[20] J. Li, L. Feng, Z. Jia, *Mater. Lett.* 2006, 60, 746.
[21] D. C. Marcano, D. V. Kosynkin, J. M. Berlin, A. Sinitskii, Z. Sun, A. Slesarev, L. B. Alemany, W. Lu, J. M. Tour, *ACS Nano* 2010, 4, 4806.
[22] J.-B. Wu, M.-L. Lin, X. Cong, H.-N. Liu, P.-H. Tan, *Chem. Soc. Rev.* 2018, 47, 1822.
[23] I. Childres, L. A. Jauregui, W. Park, H. Caoa, Y. P. Chena, in *New Dev. Phot. Mater. Res.,* 2013.
[24] I. Childres, L. A. Jauregui, W. Park, H. Caoa, Y. P. Chena, in *New Dev. Phot. Mater. Res.,* 2013, pp. 403-418.
[25] F. T. Thema, M. J. Moloto, E. D. Dikio, N. N. Nyangiwe, L. Kotsedi, M. Maaza, M. Khenfouch, *J. Chem.* 2013, 2013, 1.
[26] L. Stobinski, B. Lesiak, A. Malolepszy, M. Mazurkiewicz, B. Mierzwa, J. Zemek, P. Jiricek, I. Bieloshapka, *J. Electron Spectros. Relat. Phenomena* 2014, 195, 145.
[27] A. R. Thiruppathi, B. Sidhureddy, M. Salverda, P. C. Wood, A. Chen, *J. Electroanal. Chem.* 2020, 113911.

The invention claimed is:

1. A process for preparing expanded graphite comprising:
a) mixing graphite with $H_2SO_4/H_3PO_4$ to form a first mixture;
b) adding $KMnO_4$ to the first mixture to form a second mixture;
c) adding at least one Fe(III) salt to the second mixture under conditions to form a solid graphite-intercalated compound;
d) separating the solid graphite-intercalated compound from the second mixture; and
e) heating the solid graphite-intercalated compound under conditions to provide the expanded graphite.

2. The process of claim 1, wherein a) and/or b) and/or c) is carried out at a temperature from about 0° C. to about 40° C.

3. The process of claim 1, wherein the $H_2SO_4/H_3PO_4$ is present in a ratio of at least 10:1 mL:grams of graphite.

4. The process of claim 1, wherein the $H_2SO_4/H_3PO_4$ is present in a volume ratio of $H_2SO_4$:$H_3PO_4$ of 10-x:x, where x is equal to 0.1 to 4.

5. The process of claim 1, wherein the $KMnO_4$ is present in a ratio (w/w) of about 1:1 to about 4:1 $KMnO_4$:graphite.

6. The process of claim 1, wherein the at least one Fe(III) salt is selected from the group consisting of $FeCl_3$, $Fe(NO_3)_3$ and $Fe_2(SO_4)_3$ and their hydrates.

7. The process of claim 1, wherein the at least one Fe(III) salt is in a ratio (w/w) of about 0.25:1 to about 2:1, Fe(III) salt:graphite.

8. The process of claim 1, wherein the graphite is graphite powder.

9. The process of claim 1, further comprising rinsing and/or drying the graphite-intercalated compound prior to e).

10. The process of claim 1, wherein e) is carried out at a temperature of about 350° C. to about 800° C.

11. The process of claim 1, wherein the expanded graphite is prepared in the absence of binder.

12. The process of claim 1, wherein the expanded graphite has an about 20 to about 100 times volume expansion from the graphite.

13. A process for preparing exfoliated graphene oxide comprising:
a) compressing expanded graphite to form a flexible graphite foil;
b) immersing the flexible graphite foil in a solution comprising at least one alkali metal hydroxide and optionally at least one oxidizing agent, and applying a first voltage;
c) removing at least a portion of the flexible graphite foil from the solution;
d) re-immersing the flexible graphite foil in the solution and applying a second voltage under conditions to electrochemically exfoliate the flexible graphite foil to provide the exfoliated graphene oxide.

14. The process of claim 13, wherein the at least one alkali metal hydroxide is selected from NaOH, LiOH, KOH, or mixtures thereof.

15. The process of claim 13, wherein the at least one oxidizing agent, when present, is $H_2O_2$.

16. The process of claim 13, wherein the first voltage is about +0.1 to about +3 V.

17. The process of claim 16, wherein the second voltage is greater than +3 V.

18. The process of claim 13, wherein the exfoliated graphene oxide has an oxygen content of about 15% to about 30%.

19. The process of claim 16, wherein at least step d) is carried out by an automated system.

20. The process of claim 16, wherein steps b), c) and d) are carried out by an automated system.

21. A process for preparing exfoliated graphene oxide comprising:
a) mixing graphite with $H_2SO_4/H_3PO_4$ to form a first mixture;
b) adding $KMnO_4$ to the first mixture to form a second mixture;
c) adding at least one Fe(III) salt to the second mixture under conditions to form a solid graphite-intercalated compound;
d) separating the solid graphite-intercalated compound from the second mixture;
e) heating the solid graphite-intercalated compound under conditions to provide expanded graphite;

f) compressing the expanded graphite to form a flexible graphite foil;
g) immersing the flexible graphite foil in a solution comprising at least one alkali metal hydroxide and optionally at least one oxidizing agent, and applying a first voltage;
h) removing at least a portion of the flexible graphite foil from the solution;
i) re-immersing the flexible graphite foil in the solution and applying a second voltage under conditions to electrochemically exfoliate the flexible graphite foil to provide the exfoliated graphene oxide.

* * * * *